I. D. SPANGLER.
SIX SPEED COMBINATION GEAR SET.
APPLICATION FILED OCT. 7, 1913.
1,137,547.
Patented Apr. 27, 1915.
2 SHEETS—SHEET 1.
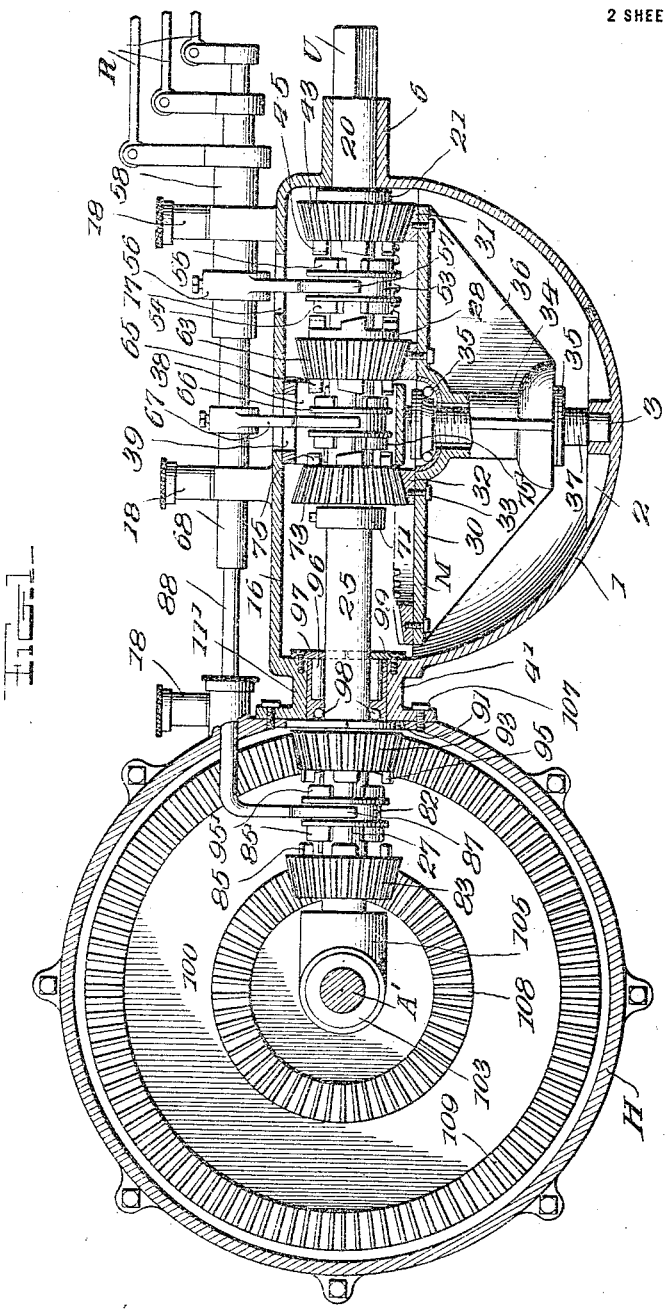
Witnesses
Inventor
Ira D. Spangler.
By 
Attorneys

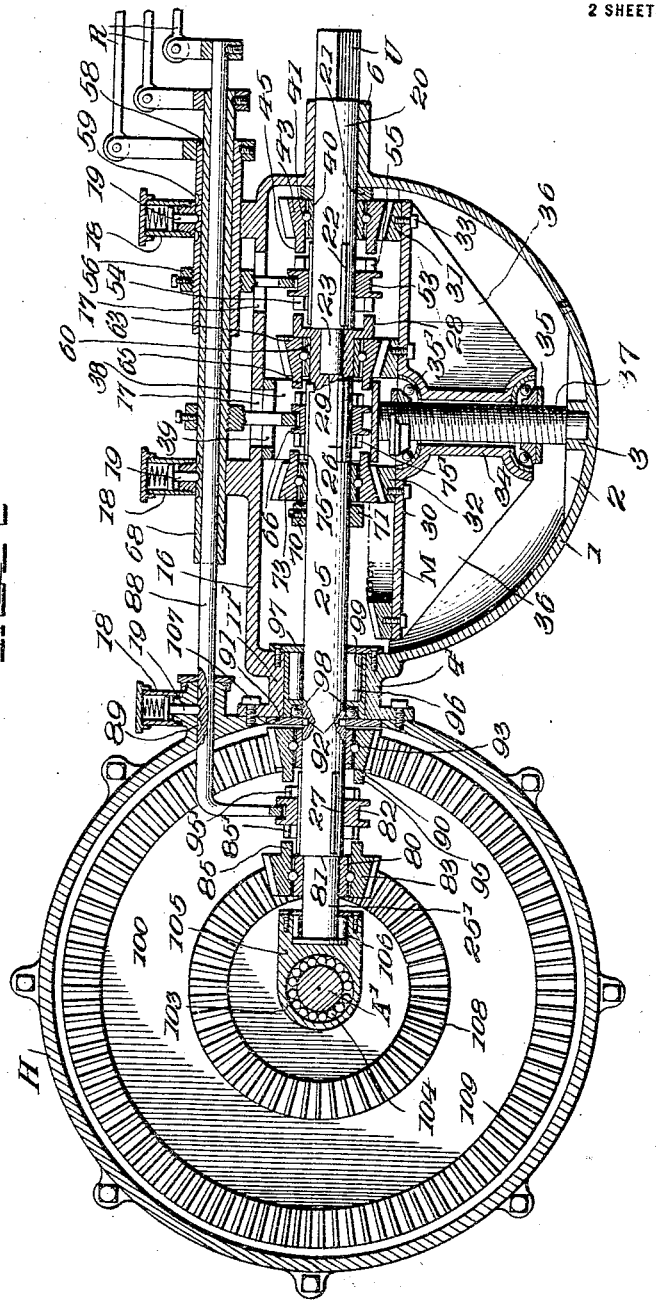

UNITED STATES PATENT OFFICE.

IRA D. SPANGLER, OF SALIDA, COLORADO, ASSIGNOR OF ONE-HALF TO PERRY H. SPANGLER, OF CALLENDER, IOWA.

SIX-SPEED COMBINATION GEAR SET.

1,137,547.  Specification of Letters Patent.  Patented Apr. 27, 1915.

Application filed October 7, 1913. Serial No. 793,867.

*To all whom it may concern:*

Be it known that I, IRA DANIEL SPANGLER, a citizen of the United States, residing at Salida, in the county of Chaffee and State of Colorado, have invented certain new and useful Improvements in Six-Speed Combination Gear Sets; and I do declare the following to be a full, clear, and exact description of the invention, such as will enable others skilled in the art to which it appertains to make and use the same.

This invention relates to machine elements, and more especially to transmission mechanism ordinarily employed in motor vehicles.

The main objects of the invention are to provide novel gear shifting means and to effectively provide for the lubrication of certain gears to be described. These objects are carried out by the mechanism hereinafter more fully described and claimed, and as shown in the drawings wherein—

Figure 1 is a general side elevation with the casing in section, and Fig. 2 is a longitudinal vertical sectional view through the entire gear set.

I may say at starting that this combination gear set includes the transmission mechanism proper which provides for forward high speed on direct drive, forward low speed, and reverse low speed; and a large disk secured to the differential mechanism and having two rows of gear rings with either of which the driven shaft section is adapted to be connected, so that by driving this disk from its larger or smaller ring six speeds are obtained from the transmission mechanism proper which provides for only three speeds. The combination gear set therefore simplifies the construction of the transmission mechanism proper and yet does not greatly complicate the mechanism within the differential casing or housing. If the driver is satisfied with the three speeds produced by the differential mechanism, he need not shift the gear which connects it with the disk in the transmission mechanism and still he will have two speeds ahead and one reverse. If one of the gear rings on said disk should become defective, or one of the smaller gears or pinions meshing therewith should become defective, the machine may still be driven on the other and the operator will yet have two speeds ahead and one reverse. In the drawings herewith I have amplified the housing H for the differential mechanism D so as to include this connection between the rear end of the shaft and the large gear or "disk" as I will call it which is attached to such differential. The latter may be of any suitable type not necessary to describe, and it connects the meeting ends of the two rear axle sections A and A′ in the well known manner. I make this explanation so that the reader will understand that in this specification where I speak of differential mechanism and housing I refer to all that at the left portion of Fig. 2, and where I speak of transmission mechanism I refer to all that at the right portion of the same view.

The transmission casing in the present instance will doubtless be constructed of aluminum or other light substantial sheet metal, and in contour it may simulate the lower half of a sphere. Its lower portion 1 has internal webs 2 intersecting a central socket 3, and around its open upper end is a radial flange (not shown) upon which is detachably secured the upper portion or top—provision being made for the insertion of bearings to carry the shaft in a manner well understood. Across the otherwise flat top is formed an arch 16 slotted in its crown at 17, 17, and adjacent each slot is a bearing post 18 which is by preference hollow and contains a spring-actuated catch 19 yet to be described.

The shaft sections of the transmission mechanism are disposed end to end and extend through this casing beneath its arch 16. The power shaft section 20 will be connected at U with a universal joint through which it is driven from the engine or from the clutch if one is employed, but these details are not necessary to illustrate. Thence it passes through a suitable bearing at the point 6, inside of which it has an enlarged shoulder 21, near its inner end it has a key or feather 22 (or any suitable structure forming part of a spline, as perhaps by having its body squared), and its inner extremity is reduced and rounded into a stub shaft 23. The driven shaft section 25 is somewhat longer than the power shaft section, and in fact extends beyond the transmission mechanism proper and into the housing of the differential mechanism. Its body is provided with two keys or feathers 26, 27, its inner end is enlarged into a toothed head 28, and within this head its inner extremity has a cylindrical socket 29 in which the stub shaft 23 of the power shaft section rotates freely when the two sections are in place.

A master gear M is disposed within the casing 1 beneath the shaft section, and is employed with the transmission mechanism except on direct drive. It is shown herein as having a flat body 30 carrying two rings 31 and 32 of gear teeth, each of which may be made in a complete ring or in sections but secured to the body 30 by screws 33 so that a defective ring may be repaired. The body is mounted on a rather long depending hub 34 supported by adjustable ball bearings 35 and 35' on a post 37 whose lower end is seated in said socket 3 and whose upper end carries a two-part eye 38 whose lower part underlies the driven shaft section and the mechanism thereon and whose upper part is slotted as at 39 as seen in Figs. 1 and 2. By adjusting the ball bearings on the post, all wear therein may be taken up and the entire master gear can be set higher so that its toothed rings mesh with the pinions or small gears hereinafter described, without noise or loss of motion. In order to keep all parts thoroughly lubricated within the casing 1, I support the body 30 from the hub by means of a number of upright wings 36 as shown, and when this master gear rotates within the casing the oil in the latter will be splashed and will be driven against the spherical wall thereof by centrifugal force, so that it will travel up said wall and lubricate parts even above the normal level of the oil itself. Yet the construction is such that the entire master gear and its post can be raised out of the casing when necessary.

The power gear and other gears are of the same size so that they can be made from the same dies and will be inter-changeable. This detail renders the gear sets cheap to make and easy to repair. A collar 40 shrunk on or otherwise secured to the shaft is provided with an annular groove for a series of balls 41, and around these is disposed the annular body 43 of the gear which is internally grooved to receive said balls and externally toothed as shown at the right of Fig. 2—the teeth being preferably inclined slightly so as to engage the outer ring 31 of teeth on the master gear. The shoulder 21 on this shaft serves as a thrust bearing for the power gear, and the collar 40 may stand in close contact with said shoulder. Fingers 45 project from the small end of this gear and constitute a clutch element.

For connecting the power gear with the shaft so as to rotate the former from the latter a clutch is employed whose body 53 is externally channeled and internally grooved to travel on the feather 22. One end of this body has fingers 54 and the other end fingers 55 constituting a clutch element adapted to engage the fingers 45 on the power gear. The channel is loosely engaged by a fork 57 which rises through the slot 17 in the casing and is attached to an eye 56, and the latter is adjustably mounted on a large tube 58 which slides through the right hand bearing post 18 and is provided with three notches or depressions 59 in its upper side adapted to come under the tip of the spring catch 19 for a purpose yet to appear. When this tube is set to a neutral position shown in Fig. 2, the fingers 54 and 55 engage nothing and the power shaft section 20 may rotate without revolving anything but the clutch body and the collar 40 constituting the hub of the power gear, as the body of the power gear is mounted loosely around said hub and will not then rotate with it. When the tube 58 is shifted to the left, the fingers 54 engage the toothed head 28 of the driven shaft section 25, and the machine is on direct drive at high speed, although the rapidity of this speed may be controlled by the co-acting portion of the mechanism within the differential as yet to be explained. When the tube 58 is shifted to the right in Fig. 2 the fingers 55 engage the fingers 45 on the power gear and the body of the latter is connected with and rotated by the shaft. Then its teeth which are in constant mesh with the master gear rotate the latter, and the master gear in turn rotates whatever gear is connected therewith as will be explained below.

The low speed gear which is mounted on the driven shaft section 25 against its head 28 (the latter here constituting the equivalent of the shoulder 21) is constructed in a similar manner. Around its hub or collar 60 is a groove having balls, and around the latter moves the grooved gear-body 63 whose teeth mesh with the inner ring 32 of teeth on the master gear, and the body of this low speed gear has axial fingers 65 constituting one element of a clutch. The other element 66 thereof is moved on the feather 26 by a fork 67 (see Fig. 1) connected with a tube 68 smaller than and extending through the tube 58 as shown. When this clutch element is engaged with the fingers of the low speed gear, rotation of the master gear by the power gear in the manner above described imparts motion to the low speed gear, and the latter drives the shaft section 25 which in turn communicates its power to the rear axle in a manner yet to be described.

The reverse gear located at the other side of the axis of the master gear is constructed in a similar manner excepting that it is reversed. Against a collar 71 fixed on the shaft and constituting a shoulder similar to that numbered 21 is shrunk or fixed the collar 70 forming the hub of this gear, the same being surrounded by balls and by the gear body 73 having teeth which mesh with the inner ring 32 of teeth on the master gear and axial fingers 75 adapted to be engaged by fingers 75' on the left side of the clutch element 66 when the latter is moved in that direction by the tube 68. When the fingers or elements are connected, power imparted to the master gear by the power gear above described is transmitted to the shaft section 25 in a reverse direction and at low speed. The rear extremity of this driven shaft section 25 is reduced as shown at 25' so as to produce a shoulder 81, and against said shoulder rests the hub or collar 80 of a driven pinion which is surrounded by ball bearings and a pinion body 83 whose teeth mesh with a gear ring 108 in the disk 100 yet to be described. This pinion or gear differs slightly from the others above described, in that its fingers 85 project from its larger end as shown in Fig. 2.

Still another driven pinion has a hub or collar 90 fast on the shaft forward of the gear 80 as seen in Fig. 2, and a toothed body 93 mounted around it by ball bearings as shown, its teeth engaging a larger gear ring 109 in said disk 100, and fingers 95 project from the smaller end of this gear toward the gear 80. Slidably mounted on the feather 27 between these two gears is a clutch element 82 having fingers 85' at one end adapted to engage those numbered 85, and 95' at the other end adapted to engage those numbered 95, and the channeled body of this element is engaged by a fork 87 (see Fig. 1) whose arm is connected with or merges into a rod 88 which passes through the left hand post 18 and through the smaller tube 68 as shown. When this clutch element stands midway between two gears within the differential housing, whatever the setting of the gears or elements within the transmission casing the rotation of the shaft section 25 will not drive the machine because the rear end of this section is operatively disconnected from the disk 100. When the element 82 is moved to the right it connects the section 25 with the gear body 93 and the latter drives the disk 100 and parts connected therewith through the larger ring 109 of teeth, and when the element is moved to the left the disk is driven through the gear body 83 and the smaller ring 108 of teeth. As these rings differ in size to a considerable extent and therefore have a different number of teeth, it will be obvious that the speed at which the machine is driven may be varied at this point as well as within the transmission mechanism proper, and therefore I have shown at the right end of Fig. 2 rods which extend to within reach of the driver so as to control the position of the rod 88 as well as the position of the two tubes 58 and 68 although the exact details of the control mechanism form no part of the present invention. This rod 88 is shown in Fig. 2 as having three notches or depressions 89 moving under the tip of the left hand spring catch 19, so that the clutch element 82 may be set at either extreme position or at neutral.

The bearing near the rear portion of the driven shaft section 25 is best seen in Fig. 1, and is mounted with a two-part neck whereof the lower member 4' projects from the lower section of the transmission casing and the upper member 11' projects from the cover thereof. The bearing itself may be of any suitable type, but I have shown a roller bearing 96 held in place against a washer 97, and in rear of this roller bearing a thrust bearing 98 whose casing 99 is mounted within the neck—both of these bearings coming off the rear end of the shaft when the parts are disassembled. Between the thrust bearing and the driven pinion body 93 is disposed a two-part washer 91 (see Fig. 2) each part having a pin 92 entering a socket in the shaft section 25, and this washer constitutes the equivalent of the other shoulders against which the various gears are mounted. I make it in two parts, however, so that it may be readily removed when desired. The shoulder 71 is shown in the form of a collar adjustably mounted on the shaft by a set screw 71', so that when desired this collar can be set forward to take up wear. The shoulder at the back of the low speed gear 30 is formed by the head 28 of the driven shaft section.

The disk which has been hereinbefore referred to has by preference a flat body 100 standing in a vertical plane within the differential housing H as best seen in Figs. 1 and 2, and it is connected with the differential (not shown) in any suitable manner not necessary to amplify. On its face are the two gear rings 108 and 109 referred to above. Its hub surrounds the axle section A' which section is by preference journaled within a tubular axle casing 103 by means of roller bearings 104 or otherwise, and the casing carries a forward projection 105 containing suitable bearings 106 in which is mounted the reduced rear end 25' of the driven shaft section. The neck on the transmission casing is connected with the differential housing by flanges and screws as seen at 107 in this view. The proportions and materials of parts are not essential to the invention, and while I have described the detailed construction of many features I do not wish to be limited thereto more than by the appended claims. The action of this device is as follows: The transmission mechanism proper is set by the mechanism above described and by means of the two tubes 58 and 68 to produce two speeds ahead and one speed reverse, or to stand at neutral, and in the latter position nothing revolves with the power shaft section 20 excepting the body of the forward clutch element 53 and the hub of the driving gear.

A striking feature of my invention is that when the transmission is set at high speed on direct drive, no other part of the transmission mechanism revolves excepting the driven shaft section 25, and therefore in the ordinary running of the automobile the master gear and the other gears are idle. But this high speed may be and doubtless will be reduced by the gearing connecting the driven section or the driven gear with the rear axle as usual in automobiles. When the gear 93 and the outer gear ring 109 in the disk are employed, it will require about four revolutions of the shaft to produce one revolution of the axle, and when the gear 83 and the inner ring 108 are employed it will require about two revolutions—therefore the outer gear ring 109 may be said to reduce speed and increase power and the inner to do so to a lesser degree. As the ratios just mentioned are only suggested they would doubtless be different if the machine were intended for racing or different in another manner if the mechanism were to be applied in a truck or on an engine which was to lift heavy loads at times and yet which at other times was to be speeded up. Whatever the speed of the main shaft on direct drive or through the low speed gear, or the reverse gear, the use of the gear 93 divides it by four and the use of the gear 83 divides it by two if the ratios of these gears to the gear rings 108 and 109 are as above suggested. As I do not wish to be limited in this respect, these figures are only suggestive. With this understanding then, the driver will doubtless manipulate the control through the proper rod R to move the rod 88 and fork 87 and engage the clutch element 82 with the proper gear 83 or 93, before moving either tube 58 or 68 to set the transmission mechanism proper. In other words, according to the work which is to be performed or the load which is thrown onto the engine, he will shift the connection between the driven shaft section and the axle as the occasion requires; and then he will doubtless start by throwing in his low speed gear and later switch onto direct high drive as usual. Many advantages arise from this construction of the six speed combination gear set, and in addition to those mentioned at the beginning of this specification I might enumerate the following: As seen in the drawings the entire device is extremely compact and small, especially when compared with similar mechanisms providing for six speeds. The rear end of the shaft is in all cases connected with the rear axle by gearing of some kind and inclosed within a housing, and as seen in the drawings this housing is made only a trifle larger than the differential which is ordinarily incased any way. Therefore three of the six speeds are obtained at the cost of but little more space and an additional ring around the disk 100. This divides the working parts between the differential housing and the transmission mechanism casing, and when the cover of the latter is taken off the few parts therein are readily accessible and easily repaired and replaced. While the use of ball bearings throughout renders the device as nearly noiseless as possible, on a cheaper grade of machine the balls might be omitted. Even the omission of one ring on the disk would leave the transmission with two speeds forward and one speed reverse, and possessing many advantages over the transmission mechanisms now on the market.

Particular emphasis is laid upon the novel clutch or gear shifting means including the two telescopic tubes 58 and 68, the rod 88, and the forks carried by these parts, as well as upon the before described lubricating means which incorporates the casing section 1 and the radial blades or webs 36 carried by the master gear M.

What is claimed as new is:

1. In a transmission mechanism, the combination with the driving and driven shaft sections disposed end to end, the gears thereon, an upright post beneath the driven section, and a master gear journaled on said post and having rings of teeth engaging said gears; of a cup-shaped casing inclosing said master gear and in which the lower end of the post is mounted, the walls of the casing inclosing said gears and shaft sections, and radial wings beneath the gear body and outside its hub and moving within said casing, for the purpose set forth.

2. In a mechanism of the class described, the combination with a rigid member and movable elements in connection therewith; of a plurality of tubular bearings carried on said member, a plurality of sliding telescopic members in connection with the movable elements and each directly movable through one of the aforesaid bearings, and spring locking members in connection with said bearings for retaining said sliding members independently in various adjusted positions.

In testimony whereof I have hereunto set my hand in presence of two subscribing witnesses.

IRA D. SPANGLER.

Witnesses:
J. A. GRIESBAUER,
JAMES E. SCHRIDER.